United States Patent [19]

Guerin et al.

[11] 4,381,887
[45] May 3, 1983

[54] SIMPLIFIED ACOUSTO-OPTIC DEFLECTOR USING ELECTRONIC DELAYS

[75] Inventors: Jean-Michel Guerin, Los Angeles; John A. Lucero, Glendora, both of Calif.

[73] Assignee: Xerox Corporation, Stamford, Conn.

[21] Appl. No.: 189,273

[22] Filed: Sep. 22, 1980

[51] Int. Cl.³ .................................................. G02F 1/29
[52] U.S. Cl. .................................................... 350/358
[58] Field of Search .............................. 350/358, 235

[56] References Cited

U.S. PATENT DOCUMENTS 4,321,564  3/1982  Trega .................................. 350/358
4,332,441  6/1982  Margolis ............................ 350/358

Primary Examiner—William L. Sikes
Assistant Examiner—Léon Scott
Attorney, Agent, or Firm—Franklyn C. Weiss

[57] ABSTRACT

An acousto-optic deflector having a plurality of transducers formed on a planar surface of the acousto-optic medium wherein the incident laser beam is maintained at the Bragg angle as the deflection angle is changing by utilizing electronically introduced phase delays between adjacent transducer electrodes.

7 Claims, 3 Drawing Figures

SIMPLIFIED ACOUSTO-OPTIC DEFLECTOR USING ELECTRONIC DELAYS

BACKGROUND OF THE INVENTION

Acousto-optic devices for use in laser beam scanners have become viable alternatives to electro-mechanical scanners, the latter having obvious mechanical limitations, including lower scan speeds.

In an acousto-optic device, a traveling ultrasonic wave establishes a thick diffraction grating in an interaction medium, with grating spacing equal to the ultrasonic wavelength $\Lambda$. In a deflector, or scanner, the result is an angular scan, which can be converted to a linear scan with a lens.

Diffraction from the acoustically generated grating is at an angle $\theta$ given approximately by $$\theta \approx \sin\theta = (\lambda/\Lambda) = (\lambda f/v)$$

where $\lambda$ is optical wavelength measured in air, f is ultrasonic frequency, and v is ultrasonic velocity. Varying the applied acoustic frequency changes the diffraction angle of the beam, with total angular swing $\Delta\theta$ produced by the scanner proportional to frequency variation $\Delta f$ $$\Delta\theta = (\lambda\Delta f/v)$$

Thus linear frequency modulation (with df/dt constant) produces an angular scan at a constant rate.

The concept of using a stepped (or phased) transducer array to improve the bandwidth or resolution of an acousto-optic deflector has been shown in the prior art. The most important requirement for optimum diffraction efficiency of the laser beam is that the laser beam must be oriented at the Bragg angle with respect to the acoustic wavefronts. As the center frequency is changed to change the deflection angle, the Bragg angle must also change. That is, the angle between the incident laser beam and the acoustic wavefront must vary with frequency. In the phased transducer array deflector this is accomplished by grinding steps on the transducer bonding surface which are one-half wavelength high at the center frequency of operation. Furthermore, each transducer element is electrically 180 degrees out of phase with its neighboring transducer elements.

Another prior art acousto-optic deflector is described in U.S. Pat. No. 3,373,380. The patent discloses a technique for increasing the bandwidth of the transducer utilized in conjunction with interaction medium is to increase its thickness from one side to the other. Either the thickness of the piezoelectric material or that of the sandwiching electrodes may be tapered. The increased mass of the transducer element as a whole toward the one side decreases its resonant frequency. That is, the tapering of the mass across the length of the transducer in the direction of light beam travel enables the transducer to exhibit a much greater width of frequency response. In order to insure an appropriate Bragg relationship over a wide range of frequencies, at least a portion of one of the light and sound wave-fronts is curved and the direction of propagation of the sound waves relative to the light waves is such that the tangents to the curved portion include a tangent which intersects the other of the wavefronts at the Bragg angle $\theta$ corresponding to the wavelengths of the sound and light. The transducer is designed to produce curved sound wavefronts so as to make a collection of angles available which include the proper Bragg angle. This is achieved at least over a significant frequency range by constructing the transducer so that in operation it assumes a non-planar or warped contour. The warped surface of the transducer produces the curved sound wavefronts. In accordance with another embodiment, a uniform thickness transducer 30 may be selected to have a curved contour of at least its active sound propagating surface, or both its front and back surfaces. The concentric wave-fronts thus produced include many tangents one of which intersects the light wave-fronts at the Bragg angle. In another embodiment, the transducer contour is both tapered and curved. The taper causes the point of maximum vibration to move as the frequency changes. By deliberately also curving the sound wave-front shape, the sound wave-fronts follow a path of maximum power flow from the instantaneously active portion of the transducer. This path changes direction relative to the light wave-fronts with change in sound frequency so that a tangent to the sound wave-fronts intersects the light wave-fronts at the Bragg angle $\theta$ corresponding to the wavelengths of the sound and the light. That is, the sound energy is concentrated and it is turned as the sound frequency changes.

A serious limitation of the stepped transducer array and the array described in the patent described hereinabove is that they are extremely difficult to fabricate. Regarding the former, each transducer must be individually ground to its final dimension prior to bonding to the substrate. This process is costly and limited to applications where the transducer frequency is not much higher than 150 MHz. Regarding the embodiments described in the patent, tapering of the transducer/electrodes or providing a curved contour transducer increases the number of processing steps required with the attendant increase in cost.

SUMMARY OF THE PRESENT INVENTION

The present invention provides an acoustic-optic deflector which is relatively inexpensive to fabricate and wherein the incident laser beam is maintained at the Bragg angle as the deflection angle is changed by utilizing an electronically introduced phase delay between adjacent transducer electrodes. In particular, a planar transducer array is utilized, the proper phase delay between transducer electrodes being introduced electronically. The time delay is chosen to be one wavelength at the center frequency, the adjacent transducer electrodes being in phase.

An object of the present invention is to provide an acousto-optic deflector wherein the incident laser beam is maintained at the Bragg angle as the deflection angle is changed.

A further object of the present invention is to provide an acousto-optic deflector wherein the incident laser beam is maintained at the Bragg angle as the deflection angle is changed by utilizing an electronically introduced phase delay between a planar array of transducer electrodes.

It is still a further object of the present invention to provide an acousto-optic deflector having a planar array of transducer electrodes, adjacent electrodes being driven by a signal such that the transducers are in phase, a time delay of a predetermined period being electronically introduced between the driving signal and alternate electrodes whereby optimum diffraction efficiency of the incident laser beam is maintained as the deflection angle is changed.

DESCRIPTION OF THE PREFERRED EMBODIMENT

Figure 1:
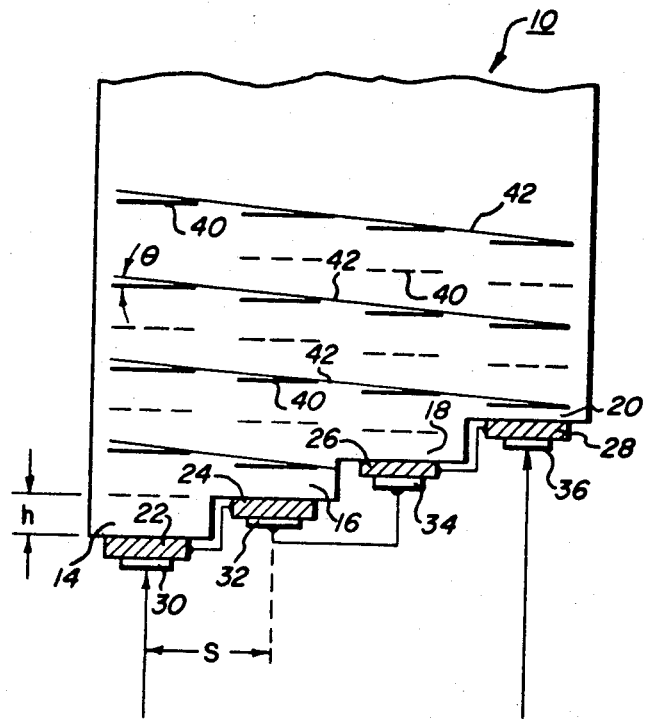
FIG. 1 is a conventional acousto-optic deflector using a physically-stepped transducer array.

FIG. 1 illustrates a prior art acousto-optic deflector 10 having a stepped substrate 12. In particular, a plurality of steps 14, 16 ... 20 which, in the fabrication process, is accomplished by grinding steps on the transducer bonding surface is illustrated, the height (h) of the steps being one-half wavelength of the center frequency of operation; i.e, $h = \frac{1}{2} V/f_o$. Transducers 22, 24 ... 28 are bonded to the corresponding substrate step and transducer electrodes 30, 32 ... 36 are, in turn, formed on their respective transducer elements. The center of each transducer electrode is spaced from the center of an adjacent transducer electrode by a distance S. A RF drive signal is applied to each transducer electrode (only two illustrated), the signal being arranged through appropriate phase shifters such that each transducer element is electrically 180° out of phase with its adjacent transducer elements.

The actual and effective acoustic wavefronts, represented by reference numerals 40 and 42, respectively, are shown within substrate 12. The effective acoustic wavefront 42 is shown tilted at the Bragg angle $\theta$ corresponding to the instantaneous value of the deflection frequency. As set forth hereinabove, since the laser beam incident on device 10 is set at a fixed angle, the angle of the acoustic wavefront must therefore be correspondingly changed. The prior art device shown in FIG. 1 accomplishes this but with the attendant increase in complexity in cost in fabricating the device.

Figure 2:
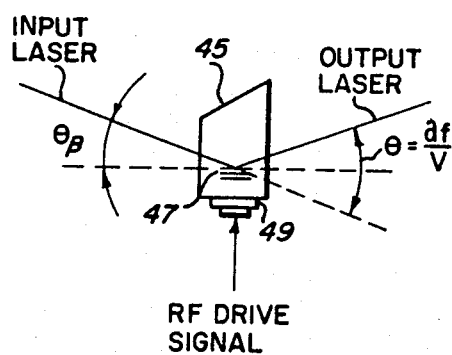
FIG. 2 schematically illustrates the Bragg angle relationship.

FIG. 2 is a simplified diagram showing the relationship of a radiation beam, such as that generated by a laser, incident on an acousto-optic medium 45 (functioning as a modulator or deflector) at the Bragg angle $\theta_B$. The laser beam interacts with the acoustic wavefront 47 generated by piezoelectric transducer 49, the output laser beam being deflected an angle $\theta = (\lambda f/v)$ where $\lambda$ is the wavelength of the incident laser beam, f is the transducer center frequency (corresponds to the resonant frequency of the ground $LiNbO_3$ piezoelectric crystal when bound to the substrate) and v is the velocity of sound in medium 45.

Figure 3:
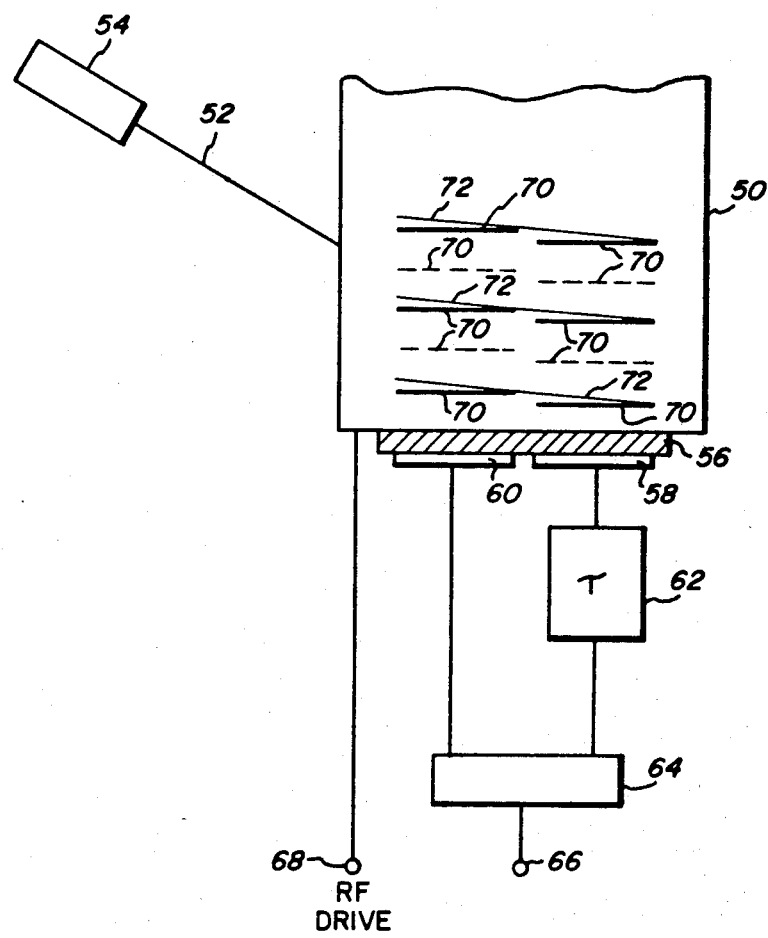
FIG. 3 illustrates the acousto-optic deflector of the present invention utilizing a planar, phased array transducer.

A specific configuration which implements the concept of the present invention is shown in FIG. 3.

The deflector substrate 50 comprises glass, such as SF8, SF57 or $TeO_2$ ($TeO_2$ is a single crystal material). The laser light beam 52 incident on the deflector may be any wavelength, such as 6328 A generated by a helium-neon laser 54, the dimensions of the electrode being dependent on the light wavelength selected. A single, planar transducer 56, preferably comprising $LiNbO_3$, is bonded to one end surface of substrate 50 by standard techniques and a pair of electrodes 58 and 60 are formed on transducer 56 by known vacuum deposition techniques.

Assuming that a particular wavelength has been selected, the following length (S) and gap (G) parameters are established:

$$S = \lambda L f_o^2 / 2nV^2 \quad (1)$$

$$G = \lambda g f_o^2 / 2nV^2 \quad (2)$$

wherein:

$\lambda$ = laser light wavelength
n = substrate index of refraction
V = substrate sound velocity
$f_o$ = RF frequency at which deflector is aligned for best Bragg diffraction ($f_o$ is related to the deflector center frequency by $f_o = f_c/1.08$ and also corresponds to the delay cable wavelength $\Lambda_o$ as set forth hereinbelow. The center frequency, fc, is determined as set forth hereinabove).

The parameters which have been found to optimize the tracking bandwidth are such that:

$$S + G = 0.7 \quad (3)$$

$$G/S = 0.05 \quad (4)$$

(or as small as possible within the limitations posed by the electrode mask and electrode deposition resolution. Additionally, proximity voltage breakdown is a factor and limits the gap, in general, to 5–10 $\mu$m).

For an SF8 glass, a helium-neon laser and for $f_o = 150$ MHz, $S = 0.666$ and $G = 0.033$.

Substituting these values in equations (1) and (2) provides a value for L of 2.6 mm and g = 0.129 mm.

The required time delay (selected to be one wavelength at the center frequency) is provided by delay element 62 connected between a power divider 64 and electrode 58. A delay element which has been successfully utilized is microcoax cable UT-34 from Uniform Tubes, Inc., Collegeville, Pennsylvania, having a 34 mils diameter. The RF drive signal is applied across divider 64 and substrate 50 via terminals 66 and 68, respectively, electrodes 58 and 60 being driven in phase by the RF drive signal.

If the center frequency of the transducer is $f_c$, then $$f_o = \frac{\text{Velocity of electromagnetic wave in UT-34 (0.70 c)}}{\Lambda_o}$$

$$f_o = f_c/1.08$$

where $\Lambda_o$ is the length of the delay cable introduced at electrode 20. For most applications $\Lambda_o$ is in the range from about 1.0 to about 1.65 meters which corresponds to the one wavelength at the center frequency referred to hereinabove. The actual and effective wavefronts 70 and 72, respectively, are shown in the figure and correspond to those generated by the prior art deflector shown in FIG. 1. It should be noted that fc is the center frequency of the tracking bandwidth and it should be the same frequency as the transducer resonant frequency for which the $LiNbO_3$ has been ground as set forth hereinabove whereas $f_o$ is the frequency at which the deflector is aligned for best Bragg diffraction. It is also the frequency which determines the cable delay length used; i.e., for UT-34 cable delay length = $\Lambda_o = 0.7$ $c/f_o$. Since the deflector is operating in between the Raman-Nath and Bragg regime, fc and $f_o$ are not exactly equal.

The above design gives a $\Delta f$ at 10 percent rolloff=0.52 fo, an increase of about 32 percent over a one electrode transducer. For example, if the peak of the diffraction intensity versus frequency curve is assumed to be 100%, the frequency range $\Delta f$ over which the diffraction intensity is $\geq 90\%$ (100%−90%=10% rolloff) is noted. For the two electrode phased array this was determined to be 0.52 $f_o$. If a deflector at 150 MHz center frequency is provided, then $f_o$=150/1.08=138 MHz. The 10% rolloff bandwidth is then 72 MHz.

It should be noted that although FIG. 3 illustrates two electrodes formed on transducer 56, the concept can be extended to more than two electrodes. In this case, the drive signal would be applied directly to the first electrode, delayed by $\tau$ before being applied to the next adjacent electrode, delayed by $2\tau$ before being applied to the following electrode, and so on. Appropriate electronic delays would be provided for this arrangement.

While the invention has been described with reference to its preferred embodiment, it will be understood by those skilled in the art that various changes may be made and equivalents may be substituted for elements thereof without departing from the true spirit and scope of the invention. Further, many modifications may be made to adapt particular situations or materials to the teaching of the invention without departing from its essential teachings.

What is claimed is:

1. An acousto-optic deflector comprising:
   means for projecting a beam of substantially monochromatic light along a predetermined path;
   a light-sound interaction device comprising an acoustic-wave transmitting medium and transducer means coupled to said medium for propagating therein, across said predetermined path, sound waves in a direction longitudinally related to said path but inclined thereto at an angle selected to provide Bragg diffraction of said light beam, said transducer means comprising a transducer element bonded to one edge of said medium in a substantially planar arrangement;
   a plurality of electrodes coupled to said transducer element, the length L of each electrode and gap g therebetween being selected to optimize diffraction efficiency of the light as it interacts with said sound waves as the deflection angle between said predetermined path of monochromatic light and said sound waves is caused to change; and
   means for applying an RF drive signal to said plurality of electrodes, said drive signal being applied directly to one of said plurality of electrodes and coupled to each of the other electrodes via means for electronically delaying said drive signal.

2. The deflector as defined in claim 1 wherein the electrode length S and gap G parameters are determined by the following equations:

$$S = \lambda L f_o^2 / 2n V^2$$

$$G = \lambda g f_o^2 / 2n V^2$$

wherein
$\lambda$ = laser light wavelength
n = substrate index of refraction
V = substrate sound velocity.

3. The deflector as defined in claim 2 wherein the parameters are substantially as follows $$S + G = 0.7$$

$$G/S = 0.05.$$

4. The deflector as defined in claim 2 wherein said medium comprises glass.

5. The deflector as defined in claim 4 wherein said transducer element comprises LibNO$_3$.

6. The deflector as defined in claim 1 wherein at least one of said electronic delay means comprises a delay element the length of which is selected to be one wavelength at the center frequency for which the transducer element has been ground.

7. The deflector as defined in claim 1 wherein the transducer electrodes are driven electrically in phase.

* * * * *